United States Patent
Neufeldt et al.

(10) Patent No.: US 9,315,214 B2
(45) Date of Patent: Apr. 19, 2016

(54) SUPPORT STRUCTURE FOR A MOTOR VEHICLE

(71) Applicant: AUDI AG, Ingolstadt (DE)

(72) Inventors: Christian Neufeldt, Bad Friedrichshall (DE); Arjan Strating, Weinsberg (DE); Klaus-Dieter Carle, Heilbronn (DE); Astrid Hanczewski, Bad Rappenau (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/415,458

(22) PCT Filed: Jul. 12, 2013

(86) PCT No.: PCT/EP2013/002079
§ 371 (c)(1),
(2) Date: Jan. 16, 2015

(87) PCT Pub. No.: WO2014/012644
PCT Pub. Date: Jan. 23, 2014

(65) Prior Publication Data
US 2015/0191204 A1    Jul. 9, 2015

(30) Foreign Application Priority Data
Jul. 17, 2012   (DE) .......................... 10 2012 014 117

(51) Int. Cl.
*B62D 25/04*    (2006.01)
*B62D 25/14*    (2006.01)

(52) U.S. Cl.
CPC .............. *B62D 25/04* (2013.01); *B62D 25/145* (2013.01)

(58) Field of Classification Search
CPC .... B62D 25/04; B62D 25/081; B62D 25/082; B62D 25/14; B62D 25/145; B62D 27/02; B62D 27/023
USPC ............ 296/70, 192, 193.02, 193.06, 193.09, 296/203.02
See application file for complete search history.

(56) References Cited

U.S. PATENT DOCUMENTS

| 5,941,597 | A | 8/1999 | Horiuchi |
| 7,798,562 | B2 * | 9/2010 | Wrobel ................ B62D 21/157 296/193.02 |
| 8,690,218 | B2 | 4/2014 | Kühl |
| 2002/0105204 | A1 | 8/2002 | Scheidel |
| 2008/0122264 | A1 | 5/2008 | Wrobel |

(Continued)

FOREIGN PATENT DOCUMENTS

| DE | 195 18 946 | 11/1995 | |
| DE | 0836983 A2 * | 4/1998 | ............. B62D 25/04 |

(Continued)

OTHER PUBLICATIONS

German to English translation of EP 0836983; retreived Aug. 20, 2015 via PatentTranslate on the EPO website.*

(Continued)

*Primary Examiner* — Jason S Daniels
(74) *Attorney, Agent, or Firm* — Henry M. Feiereisen LLC

(57) ABSTRACT

A support structure for a motor vehicle includes at least two A pillars, a front wall and a front wall cross beam which is designed as a hollow profile and whose ends are connected to the respectively assigned A pillar. The connection of the front wall cross beam end is established by a torsionally rigid rooting in the A pillar.

8 Claims, 2 Drawing Sheets

(56) References Cited

U.S. PATENT DOCUMENTS

2011/0156446 A1    6/2011    Iwase
2012/0175915 A1*   7/2012    Weigl .................. B62D 25/145
                                                                                                      296/193.06

FOREIGN PATENT DOCUMENTS

| DE | 101 04 790 | 8/2002 |
|---|---|---|
| DE | 10 2004 060 190 | 9/2005 |
| DE | 10 2006 055721 | 5/2008 |
| DE | 10 2009 026 299 | 2/2011 |
| EP | 2 353 974 | 8/2011 |
| JP | 2005 206 107 | 8/2005 |
| WO | WO 95/04616 | 2/1995 |
| WO | WO 2008/050237 | 5/2008 |

OTHER PUBLICATIONS

International Search Report issued by the European Patent Office in International Application PCT/EP2013/002079.

* cited by examiner

SUPPORT STRUCTURE FOR A MOTOR VEHICLE

CROSS-REFERENCES TO RELATED APPLICATIONS

This application is the U.S. National Stage of International Application No. PCT/EP2013/002079, filed Jul. 12, 2013, which designated the United States and has been published as International Publication No. WO 2014/012644 and which claims the priority of German Patent Application, Serial No. 10 2012 014 117.3, filed Jul. 17, 2012, pursuant to 35 U.S.C. 119(a)-(d).

BACKGROUND OF THE INVENTION

The invention relates to a support structure for a motor vehicle.

Such support structures are well known in modern vehicle construction and are important components of a motor vehicle. They consist mainly of a front wall cross beam and two A-pillars, which are designed, on the one hand, to ensure the required stability and connection rigidity and, on the other hand, to absorb impact forces through deformation in a vehicle collision. In particular, the support structure of the motor vehicle must have a stiffness that minimizes damage to the vehicle and the risk to the occupant in the event of a vehicle crash. Typically, the front wall cross beam is connected to the A-pillars by way of simple flange connections, which may typically cause a significant intrusion into the front section of the vehicle and thus also into the passenger compartment in an impact.

DE 10 2006 055 721 A1 discloses, for example, a support structure for a motor vehicle with two A-pillars, a front wall and a front wall cross beam designed as a hollow profile. The ends of the front wall cross-member are connected to the respective associated A-pillar via flanges which are produced by bending corresponding portions of the front wall cross beam designed as a hollow profile.

Another support structure for a vehicle at a strut mount is described, for example, in the published patent application EP 2353974 A2. The strut mount is in an upper connection region connected with a fender carrier and in a lower connection region with one of the longitudinal beams arranged with an offset from the fender carrier. To connect the strut mount to the longitudinal beam, two legs of the strut mount clasps the longitudinal beam embodied as a hollow profile, wherein the first leg which is integrally formed with the strut mount is firmly connected to the longitudinal beam. The second leg of the strut mount embodied as an additional component is fixedly connected to the strut mount in a first end region and rests in a second end region against an outer wall of the longitudinal beam.

SUMMARY OF THE INVENTION

It is the object of the invention to provide a support structure for a motor vehicle, which enables a particularly rigid and stable connection of a front wall cross beam to the A-pillars.

The object is attained according to the invention by providing a support structure for a motor vehicle at least with two A-pillars, a front wall and a front wall cross beam constructed as a hollow profile, whose ends are connected to the respectively associated A-pillar, wherein the end of the front wall cross beam is connected via a torsionally rigid rooting in the A-pillar.

In order to provide a support structure for a motor vehicle, which enables a particularly rigid and stable connection of a front wall cross beam to the A-pillars, the invention proposes that the end of the front wall cross beam is connected by way of a torsionally rigid rooting in the A-pillar. An essential advantage of the invention is that the front wall cross beam has a secure support and a particularly stable connection with the respective A-pillar in the region of the node geometry, which significantly improves the torsional rigidity in the event of a vehicle crash. In this context, the term "node geometry" refers to a number of connections between components in a confined space that exceeds a normal measure. In this way, torque loads and pressure loads that act on the body in particular obliquely or not ideally perpendicularly can advantageously be easily dissipated by the support structure of the body and homogeneously transferred to the support structure of the body. With the connections of the front wall cross beam according to the invention, it can advantageously be ensured that the impact forces acting via the front wall cross beam on the front wall and in particular on the A-pillars via the front wall cross beam can be particularly well received and uniformly transmitted, thereby preventing force peaks and relieving the adjacent support structures of the body. Due to the connection according to the invention, the rigidity of the body of the vehicle can be greatly improved, so that large torques and large tensile forces and large compressive forces can be optimally absorbed. In addition, the node geometry formed in the region of the connection according to the invention advantageously has, in addition to a low weight and a high stiffness, a balanced tension-compression ratio with improved specific energy absorption performance. The connection according to the invention can be readily and economically produced. As a result, the protection of the front end of the vehicle body and of the engine compartment and of the occupants of the vehicle can be improved, because the support structure can be better utilized in the event of a frontal impact for dissipating impact energy, thereby greatly reducing intrusions in the engine compartment and the passenger compartment.

In an advantageous embodiment of the support structure of the invention, the front wall cross beam hollow profile may have an outer shell facing away from the front wall and an inner shell facing the front wall. Advantageously, a torsionally rigid and lightweight support structure can thus be produced which can receive applied impact forces over a large area and thus further improve the torsional rigidity. This provides a front wall cross beam with a large cross-section and a high rigidity having a simple design whose large contact surfaces or connection surfaces are optimally suited for easy installation with a secure connection to the support structure of the vehicle body. The arcuate portions of the preferably W-shaped front wall cross beam have both a high flexural rigidity and a high torsional rigidity and can therefore ensure a reliable transmission of the applied impact forces into the A-pillar.

In another advantageous embodiment of the support structure according to the invention, an end region of the outer shell may be at least partially arranged inside the A-pillar and an end region of the inner shell may at least partially abut the A-pillar. In this way, a material connection or non-positive connection of the end portion of the front wall cross beam hollow profile may be distributed across multiple regions and/or multiple layers of the A-pillar profile, whereby pressure forces can, be distributed and transferred over a large area of the interior surfaces and exterior surfaces of the A-pillar profile. Due to the large-area connection, a load path with continuous flow of forces can be generated which can prevent kinking or twisting of the front wall cross beam connected to the A-pillar. With the inventive connection of the front wall cross beam inside the A-pillar, the A-pillar can also be additionally stabilized in its center from the inside.

In another advantageous embodiment of the support structure according to the invention, the end portion of the outer shell disposed inside the A-pillar may at least partially abut a reinforcing element. This can advantageously improve the torsional rigidity of the reinforcing element. In particular, by a deliberate arrangement of the reinforcing element, the load-bearing capacity of the front wall cross beam and the energy absorption capacity of the support structure of the body can be specifically adjusted. The end portion of the outer shell can be additionally stabilized and kinking of the outer shell at the end portion can be prevented. In this way, the end portion of the outer shell can transfer and dissipate an introduced impact force to the two sections of the A-pillar and/or in two directions of the A-pillar. Applied impact forces or torques can be effectively absorbed in the end portion of the outer shell or in the region of the A-pillar by the multiple connections of the end portion of the outer shell. The reinforcing element may be configured differently and/or may partially or fully enclose the front wall cross beam and thereby absorb particularly well increased pressure loads and transfer those to adjacent components. As another advantage, the two components can be moved in a horizontal plane as well as in a vertical plane prior to forming the final connection in order to compensate for possibly existing tolerances. Advantageously, the assembly can be simplified and tolerances be compensated already during insertion of the front wall cross beam into the A-pillar, thereby reducing manufacturing costs and assembly costs.

In another advantageous embodiment of the support structure according to the invention can, the end portion of the outer shell which is arranged inside the A-pillar may at least partially abut an element of the A-pillar. Via a further connection of the end portion of the outer shell, a part of the occurring torques and tensile forces or compressive forces can be transferred to the A-pillar via the element, thereby further improving the torsional rigidity and the positional stability of the front wall cross beam. Advantageously, each additional connection of the front wall cross beam to the support structure can generate a new load path for the acting forces, thereby spreading the acting forces across a large area and preventing a reduction in the point loads. Moreover, such an element can be inexpensively produced and quickly installed.

In another advantageous embodiment of the support structure according to the invention, the reinforcing element may be connected at its ends to the A-pillar. Advantageously, both sides of the reinforcing element may have a very stable support and thus absorb the load introduced by the front wall cross beam particularly well. Some of the load could then be transferred, for example, via the respective ends to the A-pillar. Such reinforcing elements can be produced inexpensively and quickly, in particular during pre-assembly.

In another advantageous embodiment of the support structure according to the invention, one of the ends of the reinforcing element may be connected to the A-pillar. Advantageously, this enables a further connection of the reinforcing element, causing additional stiffening of the reinforcing element or of the node geometry inside the A-pillar.

In another advantageous embodiment of the support structure according to the invention, the reinforcing element and the element of the A-pillar may form flanges by which they can be connected to one another, wherein a collar which the end portion of the outer shell may at least partially abut can be connected to the each of the flanges. A significant advantage are the large surfaces of the reinforcing element and of the element of the A-pillar, whereby the torsional rigidity of the reinforcing element within the node geometry can be substantially improved after the connection of the front wall cross beam.

In another advantageous embodiment of the support structure according to the invention, a reinforcing profile may be inserted into the A-pillar in a region of the A-pillar where the inner shell of the front wall cross beam abuts. Advantageously, the torsional rigidity of the A-pillar can be substantially improved by the internal stabilization of the A-pillar. Such reinforcing profiles can be produced inexpensively and installed economically.

In another advantageous embodiment of the support structure according to the invention, a stabilizing profile may be arranged in the front wall cross beam hollow profile in a transition region from a central region into an end portion of the front wall cross beam hollow profile. The U-shaped stabilizing profile can thus be easily adapted to the geometric interior dimensions of the front wall cross beam hollow profile while enabling a simple production of the stabilizing profile. Since the stabilizing profile can be permanently connected to the front wall cross beam hollow profile, a high dimensional stability of the front wall of the cross beam and in particular in the node geometry or to the connections of the front wall of the cross beam can be maintained in the event of a vehicle crash, allowing impact forces to be particularly well received and transferred.

BRIEF DESCRIPTION OF THE DRAWING

Advantageous embodiments of the invention are illustrated in the drawing and are described below.

The drawing shows in.

DETAILED DESCRIPTION OF PREFERRED EMBODIMENTS

Figure 1:
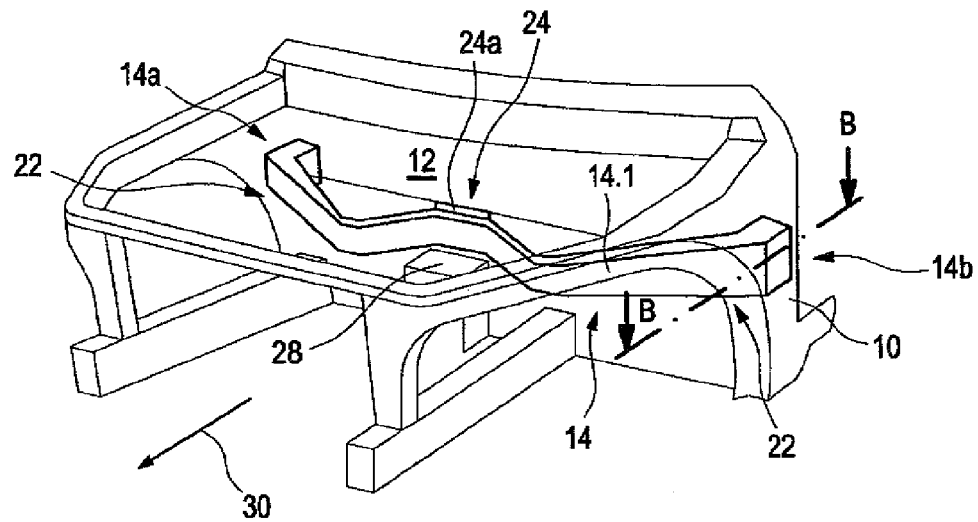
FIG. 1 a perspective view of a front structure of a vehicle body with a support structure for a motor vehicle according to the present invention, FIG. 2 a schematic sectional view of the essential parts of the support structure according to the invention for a motor vehicle with an A-pillar and a front wall cross beam along the line B-B of FIG. 1, FIG. 3 a perspective view of the support structure according to the invention from FIG. 1 in an assembled state, FIG. 4a a schematic diagram of a loosely supported beam with a central single load, and FIG. 4b a schematic diagram of a fixedly mounted beam with a central point load.
Figure 2:
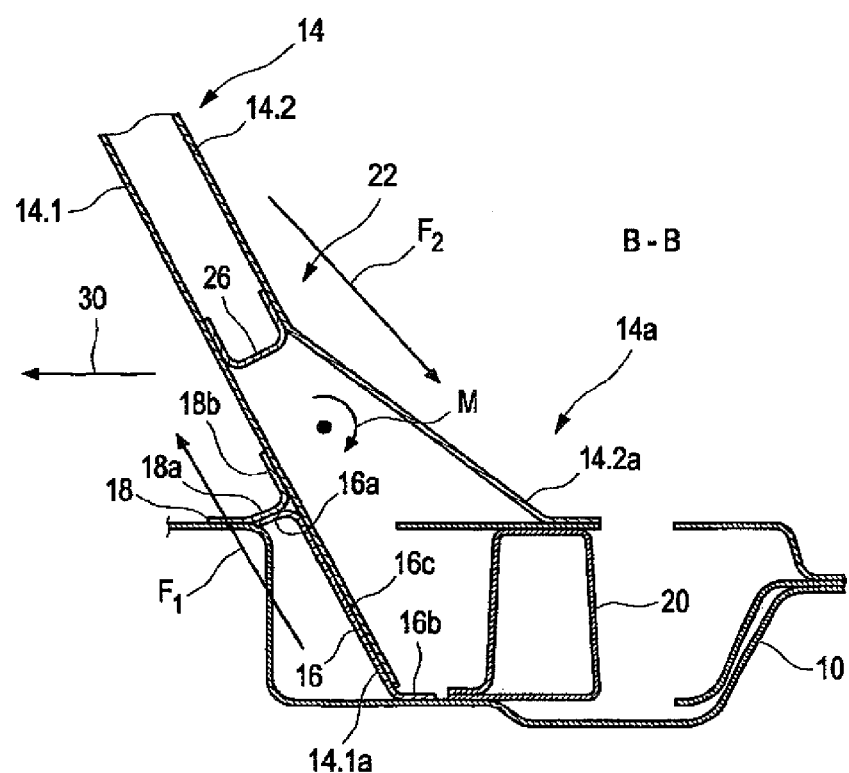
Figure 3:
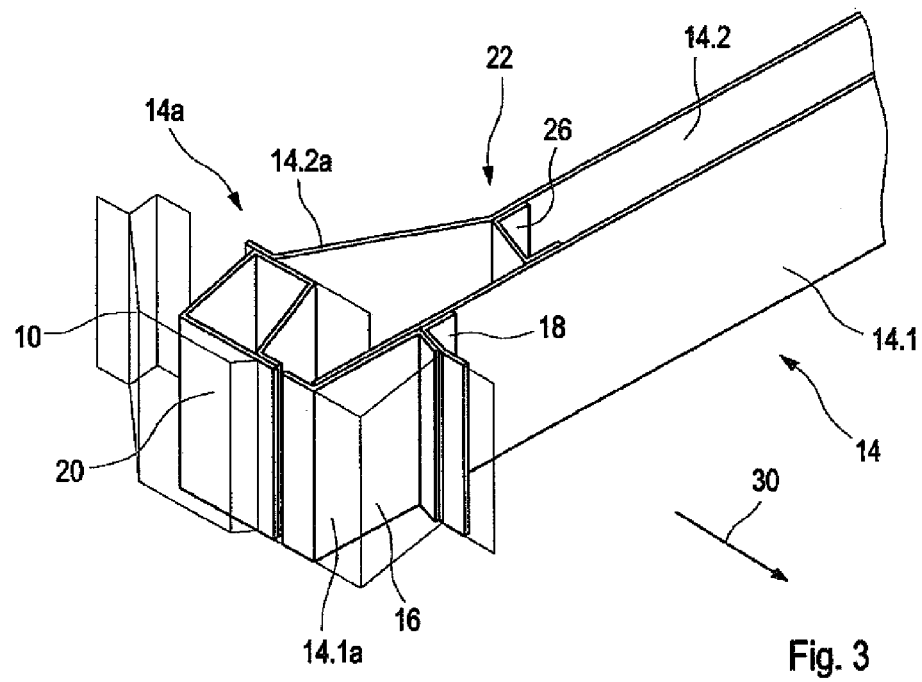

As can be seen from FIGS. 1 to 3, a front section of a vehicle body includes a support structure according to the invention for a motor vehicle, which includes two A-pillars 10, a front wall 12 and a front wall cross beam 14 constructed as a hollow section. The ends 14a, 14b of the front wall cross beam 14 are connected to the respective associated A-pillar 10. The front wall cross beam 14 has substantially a W-shape in the vehicle longitudinal direction 30 and is arranged horizontally above the center tunnel 28 of the vehicle body. The particularly strongly loaded connecting regions of the front wall cross beam 14 are enlarged in proportion to the intervening areas. Therefore, the central region 24 of the front wall cross beam 14, formed toward the front wall 12, has an enlarged contact surface 24a and is connected to the front wall 12 of the vehicle body. The preferably rectangular cross-section of the symmetrically shaped front wall cross beam 14 increases progressively towards its ends 14a, 14b. The arcuate portions of the front wall cross beam 14 that are not connected to the vehicle body are spaced from the vehicle body and are able to absorb impact forces in form of deformation energy in the event of a vehicle crash, thereby preventing an intrusion into the passenger compartment. The attachment sites of the front wall cross beam 14, which are intended to remain at least approximately undeformed during the collision phase, ensure a secure support of the front wall cross beam 14.

The invention proposes to provide a support structure for a motor vehicle, which enables a particularly rigid and stable connection of a front wall cross beam 14 to the A-pillars 10 by connecting the front wall cross beam end 14a, 14b by way of a torsionally rigid rooting in the A-pillar 10.

When the front wall cross beam 14 is not only supported in the A-pillar 10, but is according to the invention repeatedly firmly connected with and inside the A-pillar 10, the deflection of the front wall cross beam 14 can be improved in the presence of a load on the front wall cross beam 14.

Figure 4:
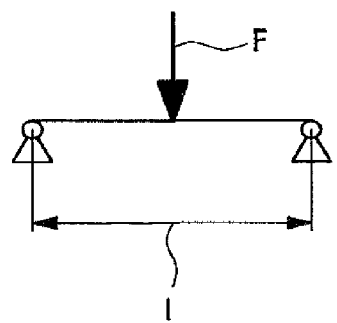
Figure 4:
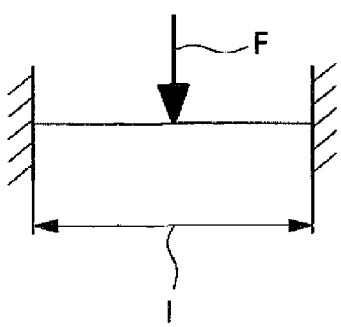

As seen from FIG. 4a, a loosely supported beam having a predetermined length I and a given modulus of elasticity E has for the same moment of inertia I and a centrally applied single load F a deflection f1, which can be approximately calculated according to equation (1).

$$f_1 = F*l^3/(48*E*I) \quad (1)$$

As seen from FIG. 4b, the same beam with the predetermined length I and the predetermined modulus of elasticity E for the same moment of inertia I and a centrally applied single load F, which is fixed at both ends, has deflection f that is less by a factor of four, which can be approximately calculated according to equation (2).

$$f_2 = F*l^3/(192*E*I) \quad (2)$$

As is further evident from FIGS. 1 to 3, the front wall cross beam hollow profile 14 has an outer shell 14.1 facing away from the front wall and an inner shell 14.2 facing the front wall. The outer shell 14.1 and the inner shell 14.2 and the shell elements of the front wall cross beam hollow profile 14 that are arranged orthogonal to the outer shell 14.1 and the inner shell 14.2 are formed substantially parallel to one another between the ends 14a, 14b of the front wall cross beam 14 and have in the direction of the ends 14a, 14b of the front wall cross beam 14 mutually diverging shell surfaces. The shell surfaces of the front wall cross beam hollow section 14 may include as additional rigidity-enhancing measure unillustrated beads or other deformations that appear advantageous to a person of skill in the art.

As is further evident from FIGS. 2 and 3, a stabilizing profile 26 is disposed in the front wall cross beam hollow profile 14 in a transition region 22 from a central region 24 in an end portion 14a, 14b of the front wall cross beam hollow profile 14. Thus, the dimensional stability in the transition region 22 is ensured by way of an additional stabilizing profile 26 formed as a reinforcing element, thus improving the torsional rigidity of the front wall cross beam hollow profile 14.

As is further evident from FIGS. 2 and 3, one end portion 14.1a of the outer shell 14.1 is at least partially disposed inside the A-pillar 10, and an end portion 14.2a of the inner shell 14.2 abuts at least partially the A-pillar 10. The inner shell 14.2 is angled in the transition region 22 for attaining a smooth load path of a force $F_2$ from the transition region 22 to the connection of the end portion 14.2a of the inner shell 14.2 to the A-pillar 10. With this arrangement of the inner shell 14.2, an impact force $F_1$ applied from the outside to the A-pillar 10 or an impact force $F_2$ applied to the front wall cross beam 14 can be transmitted without peak forces.

As is further evident from FIGS. 2 and 3, the end portion 14.1a of the outer shell 14.1 arranged inside the A-pillar 10 abuts at least partially a reinforcing element 16 and abuts at least partially an element 18 of the A-pillar 10. The reinforcing element 16 and the element 18 may be formed either flat or uneven or may also partially or completely enclose the front wall cross beam 14. The element 18 is preferably connected to the A-pillar 10 in the same plane where the end portion 14.2a of the inner shell 14.2 is connected at the A-pillar 10.

With this multiple connection of the end portion 14.1a of the outer shell 14.1, an impact force F2 introduced into the front wall cross beam 14 can be transferred to two partial sections of the A-pillar 10 and in two directions on the A-pillar 10 and dissipated. Impact forces F1, F2 or torques M acting from the outside on the A-pillar 10 and from the inside on the front wall cross beam 14 can be effectively absorbed in the end portion 14.1a of the outer shell 14.1 or in the region of the A-pillar by the multiple connection of the end portion 14.1a of the outer shell 14.1.

The reinforcing element 16 which is connected at its respective ends 16a, 16b to the A-pillar 10 has a particularly good support, wherein the reinforcing element 16 is connected at one end 16a to the element 18 of the A-pillar 10. The reinforcing element 16 is arranged parallel to the end portion 14.1a of the outer shell 14.1 and attached thereto.

As is further evident from FIGS. 2 and 3, the reinforcing element 16 and the element 18 of the A-pillar 10 form flanges 16a, 18a, through which they are connected to each other, wherein a respective collar 16c, 18b is connected to each of the flanges 16a, 18a, which the end portion 14.1a of the outer shell 14.1 at least partially abut. Both the collar 16c of the reinforcing element 16 and the collar 18b of the element 18 are arranged parallel to the end portion 14.1a of the outer shell 14.1 and attached thereto, thereby ensuring a stable connection between the components.

To provide a stable base for the many connections between the front wall cross beam 14 and the A-pillar 10 in the node geometry of the A-pillar 10, a reinforcing profile 20 is inserted in the A-pillar 10 in a region of the A-pillar 10 which the inner shell 14.2 of the front wall the cross-member 14 abuts. The reinforcing profile 20 has preferably a rectangular hollow profile and is connected via at least two outer surfaces to the inner walls of the A-pillar 10.

The components are preferably positively connected with each other at the connections by welding, in particular by spot welding, but other useful joining techniques familiar to a person of skill in the art are also conceivable.

LIST OF REFERENCE SYMBOLS

10 A-column
12 front wall
14 front wall cross beam
14a, 14b end (front wall cross beam)
14.1 outer shell (front wall cross beam)
14.1a end (outer shell)
14.2 inner shell (front wall cross beam)
14.2a end region (inner shell)
16 reinforcing element
16a, 16b flange (reinforcing member)
16c collar (reinforcing member)
18 element (A-pillar)
18a flange (element)
18b collar (element)

20 reinforcing profile
22 transition region
24 central region
24a supporting surface (middle portion)
26 stabilizing profile
28 center tunnel
30 vehicle longitudinal direction
F, $F_1$, $F_2$ force
M torque
f deflection
l length of the beam
E modulus of elasticity
I moment of inertia

The invention claimed is:

1. A support structure for a motor vehicle, comprising:
an A-pillar constructed as a hollow profile, and
a front wall cross beam constructed as a hollow profile and configured for connection to a front wall of a vehicle body, said cross beam comprising an outer shell facing away from the front wall and having an end portion sized to extend into the hollow profile of the A pillar, and an inner shell facing the front wall and having an end portion connected to an outside of an inner side wall of the A-pillar, and
a reinforcing element sized to connect coextensively with the end portion of the outer shell and having one end connected to an outer side wall of the A pillar and another end connected to the inner side wall of the A pillar.

2. The support structure of claim 1, wherein the end portion of the outer shell arranged inside of the A-pillar at least partially abuts the reinforcing element.

3. The support structure of claim 2, wherein the reinforcing element is connected at one end to an element of the A pillar.

4. The support structure of claim 3, wherein the reinforcing element and the element of the A-pillar form flanges that connect the reinforcing element and the element of the A-pillar to each other, wherein each of the flanges is connected to a respective collar that at least partially abuts the end portion of the outer shell.

5. The support structure of claim 1, wherein the end portion of the outer shell arranged at least partially inside of the A-pillar at least partially abuts an element of the A-pillar.

6. The support structure of claim 1, wherein the reinforcing element is inserted into the A-pillar in a region of the A-pillar, where the inner shell of the front wall cross beam abuts the A-pillar.

7. The support structure of claim 1, further comprising a stabilizing profile arranged in the front wall cross beam in a transition region from a central region to a respective end of the front wall cross beam.

8. The support structure of claim 1, wherein the end portion of the inner shell extends at a slanted angle to the end portion of the outer shell.

* * * * *

UNITED STATES PATENT AND TRADEMARK OFFICE
CERTIFICATE OF CORRECTION

PATENT NO. : 9,315,214 B2
APPLICATION NO. : 14/415458
DATED : April 19, 2016
INVENTOR(S) : Christian Neufeldt et al.

It is certified that error appears in the above-identified patent and that said Letters Patent is hereby corrected as shown below:

Title page

Column two, under U.S. PATENT DOCUMENTS, please correct "DE 0836983 A2" to read --EP 0836983 A2--.

Signed and Sealed this
Twenty-first Day of June, 2016

Michelle K. Lee
*Director of the United States Patent and Trademark Office*